United States Patent
Hartung

(10) Patent No.: US 11,118,458 B2
(45) Date of Patent: Sep. 14, 2021

(54) COMBINATION FOR SEALING A GAP BETWEEN TURBOMACHINE BLADES AND FOR REDUCING VIBRATIONS OF THE TURBOMACHINE BLADES

(71) Applicant: MTU Aero Engines AG, Munich (DE)

(72) Inventor: Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 24 days.

(21) Appl. No.: 16/166,293

(22) Filed: Oct. 22, 2018

(65) Prior Publication Data
US 2019/0128120 A1   May 2, 2019

(30) Foreign Application Priority Data

Oct. 27, 2017 (DE) .......................... 102017010024.1
Mar. 1, 2018 (DE) .......................... 102018203093.6

(51) Int. Cl.
*F01D 5/10* (2006.01)
*F01D 5/16* (2006.01)
(Continued)

(52) U.S. Cl.
CPC ............ *F01D 5/10* (2013.01); *F01D 5/16* (2013.01); *F01D 5/26* (2013.01); *F01D 11/006* (2013.01); *F01D 25/04* (2013.01); *F01D 25/06* (2013.01); *F04D 29/322* (2013.01); *F04D 29/668* (2013.01); *F05D 2210/12* (2013.01); *F05D 2230/22* (2013.01); *F05D 2240/242* (2013.01); *F05D 2240/80* (2013.01);
(Continued)

(58) Field of Classification Search
CPC ..... F01D 5/10; F01D 5/16; F01D 5/22; F01D 5/26; F01D 11/006; F01D 11/008; F01D 25/04; F01D 25/06; F05D 2210/12; F05D 2230/22; F05D 2240/242; F05D 2240/80; F05D 2250/71; F05D 2260/96; F05D 2300/175; F04D 29/332; F04D 29/668
See application file for complete search history.

(56) References Cited

U.S. PATENT DOCUMENTS

| 4,455,122 A | 6/1984 | Schwarzmann et al. |
| 5,161,949 A * | 11/1992 | Brioude .................... F01D 5/22 416/193 A |

(Continued)

FOREIGN PATENT DOCUMENTS

| DE | 3245069 | 6/1983 |
| DE | 69506346 | 8/1999 |

(Continued)

*Primary Examiner* — Courtney D Heinle
*Assistant Examiner* — Sang K Kim
(74) *Attorney, Agent, or Firm* — Davidson, Davidson & Kappel, LLC

(57) ABSTRACT

A combination including a seal (36-38) for sealing a gap (s) between blade platforms (11, 21) of two adjacent blades of a turbomachine and a reducer (31; 32-34) for reducing vibrations of at least one of the blades, the seal including at least one rib (36) having a rib thickness and at least one wall (37) having a wall thickness that is smaller than the rib thickness and/or the reducer including a tuning-element guide housing (32) having at least one cavity (33) in which at least one tuning element (34) is disposed with play for impacting contact with the tuning-element guide housing.

18 Claims, 1 Drawing Sheet

(51) Int. Cl.
   *F01D 25/06* (2006.01)
   *F04D 29/32* (2006.01)
   *F01D 5/26* (2006.01)
   *F04D 29/66* (2006.01)
   *F01D 11/00* (2006.01)
   *F01D 25/04* (2006.01)

(52) U.S. Cl.
   CPC ...... *F05D 2250/71* (2013.01); *F05D 2260/96* (2013.01); *F05D 2300/175* (2013.01)

(56) References Cited

U.S. PATENT DOCUMENTS

| | | | |
|---|---|---|---|
| 5,228,835 A * | 7/1993 | Chius | F01D 5/22 |
| | | | 416/193 A |
| 5,478,207 A | 12/1995 | Stec | |
| 5,803,710 A | 9/1998 | Dietrich et al. | |
| 9,371,733 B2 * | 6/2016 | Hartung | F01D 5/16 |
| 9,822,644 B2 | 11/2017 | Tardif et al. | |
| 9,856,737 B2 * | 1/2018 | Propheter-Hinckley | |
| | | | F01D 5/16 |
| 9,879,548 B2 * | 1/2018 | Annaluri | F01D 5/22 |
| 2010/0061854 A1 | 3/2010 | Townes | |
| 2013/0280083 A1 | 10/2013 | Hartung et al. | |
| 2014/0112769 A1 | 4/2014 | Schoenenbron | |
| 2016/0123157 A1 * | 5/2016 | Congratel | F01D 5/225 |
| | | | 416/185 |
| 2016/0138401 A1 * | 5/2016 | Hartung | F16F 15/32 |
| 2016/0153303 A1 | 6/2016 | Hough | |
| 2016/0222798 A1 * | 8/2016 | Snyder | B22F 3/1055 |
| 2017/0022819 A1 | 1/2017 | Weinert et al. | |
| 2017/0037734 A1 | 2/2017 | Chakrabarti et al. | |
| 2017/0314397 A1 | 11/2017 | Hartung et al. | |
| 2017/0335695 A1 * | 11/2017 | Schlemmer | F16F 7/10 |
| 2018/0142558 A1 | 5/2018 | Scharls | |

FOREIGN PATENT DOCUMENTS

| | | |
|---|---|---|
| DE | 69323501 | 9/1999 |
| DE | 102016214234 | 2/2018 |
| DE | 102016222869 | 5/2018 |
| EP | 0774048 | 2/1999 |
| EP | 2149674 A2 | 2/2010 |
| EP | 2472065 B1 | 7/2012 |
| EP | 2484870 | 8/2012 |
| EP | 2 725 193 B1 | 4/2014 |
| EP | 3054103 | 8/2016 |
| EP | 3054103 A1 | 8/2016 |
| EP | 3121385 A1 | 1/2017 |
| EP | 3181945 A1 | 6/2017 |
| EP | 3 239 461 A1 | 11/2017 |
| WO | WO 2012/095067 A1 | 7/2012 |

* cited by examiner

COMBINATION FOR SEALING A GAP BETWEEN TURBOMACHINE BLADES AND FOR REDUCING VIBRATIONS OF THE TURBOMACHINE BLADES

This claims the benefit of German Patent Applications DE 102018203093.6, filed Mar. 1, 2018 and DE 102017010024.1, filed Oct. 27, 2017, both of which are hereby incorporated by reference herein.

The present invention relates to a combination for sealing a gap between blade platforms of two adjacent blades of a turbomachine and for reducing vibrations of at least one of the blades, a turbomachine blade assembly including two adjacent blades and the combination, a turbomachine, in particular a compressor or a turbine of a gas turbine, having the turbomachine blade assembly, and to a use of the combination for sealing a gap between blade platforms of two adjacent blades of a turbomachine and for reducing vibrations of at least one of the blades.

BACKGROUND

The Applicant's EP 3 239 461 A1 describes a turbomachine blade assembly that uses a novel concept for reducing vibrations of airfoils by means of a tuning-element guide housing having at least one cavity in which at least one tuning element is disposed with play for impacting contact with the tuning-element guide housing. This novel concept is essentially not based on frictional dissipation, but on detuning natural modes and natural frequencies by impacts imparted by the tuning elements.

SUMMARY OF THE INVENTION

It is an object of an embodiment of the present invention to improve a turbomachine, in particular a compressor or a turbine of a gas turbine.

The present invention provides protection for a turbomachine blade assembly and a turbomachine having (at least) one combination described herein. Advantageous embodiments of the present invention are also presented.

In an embodiment of the present invention, a combination includes a single-piece or multi-piece seal that seals, or is intended, in particular adapted, or used to seal, a gap between blade platforms of two, in particular circumferentially, adjacent blades, in particular their circumferentially opposite (blade platform) end faces, of a turbomachine at least partially, in particular against a working fluid of the turbomachine, and further includes a single-piece or multi-piece reducing means that reduces, or is intended, in particular adapted, or used to reduce, vibrations of at least one of these two blades, in particular vibrations of at least one airfoil connected to one of the blade platforms and forming part of the respective blade for deflecting the flow of a working fluid of the turbomachine.

In an embodiment of the present invention, the seal includes at least one (first) rib having an, in particular minimum, maximum or average, rib thickness and at least one wall having an, in particular minimum, maximum or average, wall thickness that is smaller than this rib thickness and in one embodiment is no more than 75%, in particular no more than 50%, in one embodiment is no more than 25%, and in a refinement is no more than 10% of this rib thickness.

Thus, in an embodiment, the seal has a bionic structure capable of reducing the weight of the seal and/or, in particular at the same time, achieving a defined flexibility, which allows unwanted coupling between the blade(platform)s to be reduced, in particular avoided, and/or higher strength, which makes it possible to improve service life and/or reliability.

In an embodiment of the present invention, additionally or alternatively to this sealing aspect, the reducing means includes a single-piece or multi-piece tuning-element guide housing having exactly one cavity or a plurality of cavities. Exactly one tuning element or a plurality of tuning elements is/are disposed with play in the cavity or in one or (each) of the plurality of cavities and impart(s), or is/are intended, in particular adapted, or used to impart, impacts to the tuning-element guide housing during operation.

In an embodiment, this makes it possible to seal a gap of a turbomachine blade assembly with a reducing means for reducing vibrations of airfoils, which is per se known from the Applicant's WO 2012/095067 A1 and EP 3 239 461 A1 and is essentially not based on frictional dissipation, but on detuning natural modes and natural frequencies by impacts imparted by tuning elements, and thus in particular to improve an efficiency of turbomachine (blade assembly) and/or to protect the reducing means from a working fluid of the turbomachine.

As is apparent from the foregoing, both aspects may advantageously be combined in one embodiment, and, in particular, the defined flexibility of the seal according to the sealing aspect may particularly advantageously assist in the reduction of vibrations by impacts imparted by the tuning elements Similarly, in an embodiment, only one of the two abovementioned aspects may be implemented. Accordingly, in an embodiment (of the sealing aspect), the reducing means does not include a tuning element disposed in a cavity of a tuning-element guide housing, but may in particular include, in particular be, a single-piece or multi-piece, in one embodiment solid or cavityless, friction damper, in particular friction member, which is mounted with play on or relative to one or both of the adjacent blades. In this connection, in an embodiment, the defined flexibility of the seal according to the sealing aspect may particularly advantageously assist in the dissipative reduction of vibrations.

In an embodiment, the seal and the reducing means are interconnected, in particular by a web, in particular formed in one piece or integrally with each other. In a refinement, the web is configured in such a way, in particular made elastic, that it enables relative movement of the reducing means relative to the seal, and thus dissipative relative movement of the reducing means relative to the blades while the seal is substantially motionless with respect to the blades.

In an embodiment, this makes it possible to simplify the assembly.

In an alternative embodiment, the seal and the reducing means are not interconnected; i.e., unconnected to each other.

In an embodiment, this makes it possible to improve the sealing performance and/or vibration-reduction performance.

In an embodiment, the seal and/or the reducing means, in particular the tuning-element guide housing, are (each)/is completely or partially produced using a generative or additive manufacturing process.

In an embodiment, this allows the reducing means, in particular the tuning-element guide housing, and the bionic (structure of the) seal to be configured particularly advantageously.

In an embodiment, additionally or alternatively, the seal and/or the reducing means, in particular the tuning-element guide housing, are (each)/is completely or partially made of a nickel alloy, in particular Haynes230® and/or MARM509®.

In an embodiment, this advantageously makes it possible to improve the weight, service life and/or reliability of the combination.

In an embodiment, the seal includes one or more further ribs.

In a refinement, the further rib(s) has/(each) have an, in particular minimum, maximum or average, rib thickness that is greater than the aforementioned, in particular minimum, maximum or average, wall thickness of the wall and in one embodiment is at least 125%, in particular at least 200%, in one embodiment is at least 400%, and in a refinement is at least 1000% of this wall thickness of the wall.

Additionally or alternatively, the further rib or one or more of the further ribs, respectively, branches/(each) branch from the one (first) rib or intersects/intersect the same.

Additionally or alternatively, the one (first) rib and/or the further rib or one or more of the further ribs, respectively, and/or the wall of the seal is/are curved, in particular in the circumferential direction.

Thus, in an embodiment, the aforementioned features rib/wall thickness ratio, curvature, as well as branching and intersection of ribs, alone or in a combination of two or three thereof, can make it possible to produce a particularly advantageous, in an embodiment (vertebrate, in particular human) rib-cage (skeleton)-like, bionic seal and to thereby advantageously reduce the weight and/or to provide, in particular at the same time, a defined flexibility, which allows unwanted coupling between the blade(platform)s to be reduced, in particular avoided, and/or higher strength, which makes it possible to improve service life and/or reliability.

In an embodiment of the present invention, a turbomachine blade assembly includes two (in particular circumferentially) adjacent blades having, in particular radially inner or radially outer, blade platforms and airfoils which are connected thereto, in particular by a material-to-material bond or in one piece or integrally, and which serve, in particular, to deflect a working fluid of the turbomachine; a here-described combination for sealing a gap between the adjacent blade platforms, in particular their circumferentially opposite end faces, and for reducing vibrations of at least one of the blades, in particular airfoils, being disposed on a side of the blade platforms facing away from the airfoils.

In an embodiment, an axial direction is parallel to an axis of rotation or (main) machine axis of the turbomachine (blade assembly), a circumferential direction is a direction of rotation about this axis, and a radial direction is perpendicular to the axial and circumferential directions.

In an embodiment, the reducing means, in particular the tuning-element guide housing, is attached to at least one of the adjacent blades. In an alternative embodiment, the reducing means is movably disposed in a cavity on a side of the blade platforms facing away from the airfoils.

In an embodiment, this advantageously makes it possible to improve the reduction of vibrations and, in particular by attaching the tuning-element guide housing to one or both of the blades, to improve the detuning of natural modes and natural frequencies by impacts imparted by the tuning elements or, respectively, by movably disposing an, in particular solid, friction damper, in particular friction member, to improve the dissipative effect thereof.

In an embodiment, the seal is, in particular also or only, disposed downstream behind the reducing means, in particular tuning-element guide housing.

Additionally or alternatively, in an embodiment, the reducing means extends or laps over only one of the two blade platforms at least partially. In other words, in an embodiment, the reducing means is disposed only under one of the two blade platforms. This can improve in particular the detuning of natural modes and natural frequencies by impacts.

In an alternative embodiment, the reducing means extends or laps over both blade platforms (in each case) at least partially. In other words, in an embodiment, the reducing means is disposed under both blade platforms. This can improve in particular the dissipative effect of a friction damper.

In an embodiment of the present invention, the blades are rotor-mounted blades or casing-mounted vanes. In an embodiment, the turbomachine is a compressor or a turbine of a gas turbine, in particular of an aircraft engine. This constitutes particularly advantageous applications of a combination according to the present invention.

BRIEF DESCRIPTION OF THE DRAWINGS

Further advantageous refinements of the present invention will become apparent from the dependent claims and the following description of preferred embodiments. To this end, the drawings show, partly in schematic form, in:

DETAILED DESCRIPTION

Figure 1:
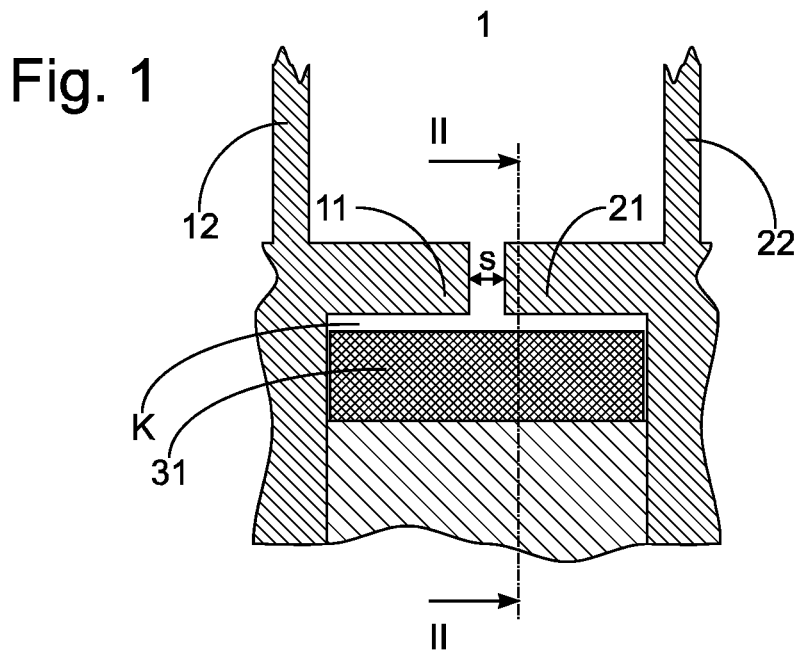
FIG. 1: a portion of a turbomachine blade assembly including a combination according to an embodiment of the present invention in an axial section taken along line I-I in FIG. 2.
Figure 2:
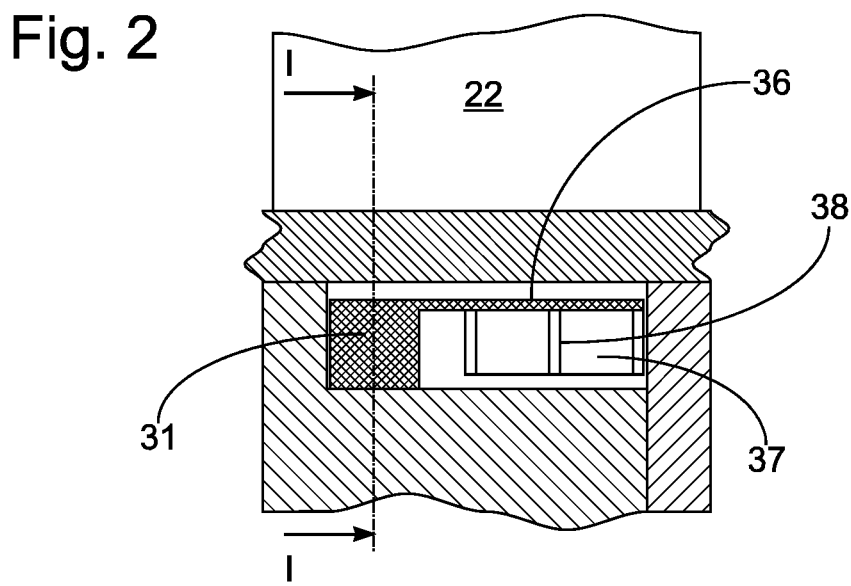
FIG. 2: a portion of the turbomachine blade assembly in a meridional section along line II-II in FIG. 1.
Figure 3:
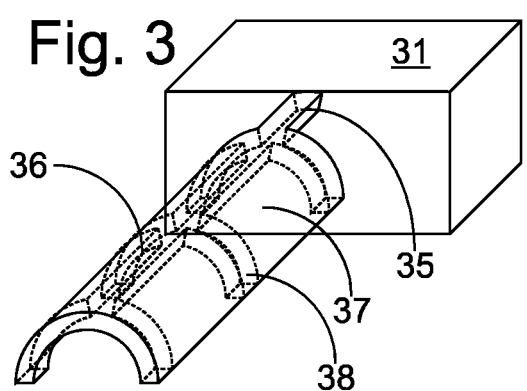
FIG. 3: a perspective view of the combination.

FIGS. 1, 2 respectively show in an axial section (FIG. 1) perpendicular to a (main) machine axis or axis of rotation of a gas turbine and in a meridional section (FIG. 2) perpendicular to this section a portion of a turbomachine blade assembly including two blades which are adjacent to one another in FIG. 1; i.e., in the circumferential direction, and which include blade platforms 11, 21 and airfoils 12, 22 connected thereto as well as a combination according to an embodiment of the present invention, shown in isolated perspective view in FIG. 3.

The combination includes a seal 36, 37, 38 (36-38) for sealing a gap s between the two adjacent blade platforms 11, 21 as well as a reducing means in the form of a solid friction damper 31 for reducing vibrations of airfoils 12, 22, the rib-cage-like seal including a first rib 36 having a rib thickness and a wall 37 having a wall thickness smaller than the rib thickness.

Seal 36-38 and reducing means 31 are interconnected by a web 35 and formed in one piece. Elastic web 35 enables dissipative relative movements of friction damper 31 and, at the same time, sealing of gap s by means of seal 36-38. In a modification seal 36-38 and reducing means 31 may also be unconnected, i.e. not directly connected.

The seal includes further ribs 38, which each also have a rib thickness greater than the wall thickness and which branch from the one (first) rib 36. These further ribs 38 and wall 37 of the seal are curved in the circumferential direction (see FIG. 3).

Friction damper 31 is movably received in a cavity K on a side of the blade platforms 11, 21 facing away from the airfoils.

Seal 36-38 is disposed downstream (to the right in FIG. 2) behind friction damper 31, which extends over each of the two blade platforms 11, 21 in the circumferential direction (see FIG. 1).

Figure 4:
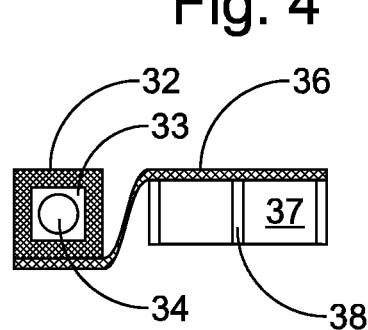
FIG. 4: a meridional section, corresponding to FIG. 2, through a combination in accordance with another embodiment of the present invention.

FIG. 4 shows, in a view similar to that of FIG. 2, a combination in accordance with another embodiment of the present invention. Corresponding features are identified by identical reference numerals, so that reference is made to the above explanations and only the differences will be discussed below.

In the embodiment of FIG. 4, which, thus, is otherwise identical to FIGS. 1-3, the reducing means includes a tuning-element guide housing 32 having a cavity 33 in which a tuning element 34 is disposed with play for impacting contact with tuning-element guide housing 32.

Web 35 is multiply curved in the axial direction (horizontally in FIGS. 2, 4) in such a way that it extends past the side of tuning-element guide housing 32 facing away from the blade platforms. In a modification (not shown), as in the embodiment of FIGS. 1-3, seal 36-38 and reducing means 32-34 may also be unconnected.

Tuning-element guide housing 32 is attached to one of the adjacent blades and extends over only one of the two blade platforms at least partially in the circumferential direction.

Although exemplary embodiments have been described hereinabove, it should be understood that many modifications thereof are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection as is derived from the claims and the combinations of features equivalent thereto.

LIST OF REFERENCE NUMERALS

11, 21 blade platform
12, 22 airfoil
31 friction damper
32 tuning-element guide housing
33 cavity
34 tuning element
35 web
36 first rib
37 circumferential surface
38 further rib
K cavity
s gap

What is claimed is:

1. A combination comprising:
   a seal for sealing at least one gap between blade platforms of two adjacent blades of a turbomachine and a reducer for reducing vibrations of at least one of the blades, the seal including at least one rib having a rib thickness and at least one wall having a wall thickness that is smaller than the rib thickness;
   wherein the seal includes at least one further rib having a further rib thickness greater than the wall thickness and which branches from the at least one rib or intersects the at least one rib;
   the seal having a first axial end and a second axial end and the reducer being located at one of the first and second axial ends of the seal.

2. The combination as recited in claim 1 wherein the seal and the reducer are interconnected.

3. The combination as recited in claim 2 wherein the seal and the reducer are interconnected by a web.

4. The combination as recited in claim 2 wherein the seal and the reducer and formed in one piece or integrally with each other.

5. The combination as recited in claim 1 wherein the seal and the reducer are unconnected.

6. The combination as recited in claim 1 wherein the seal or the reducer is at least partially produced using a generative manufacturing process or is at least partially made of a nickel alloy.

7. The combination as recited in claim 1 wherein the reducer includes a tuning-element guide housing having at least one cavity in which at least one tuning element is disposed with play for impacting contact with the tuning-element guide housing.

8. The combination as recited in claim 1 wherein the at least one rib or the at least one wall of the seal is curved.

9. The combination as recited in claim 8 wherein the at least one rib or the at least one wall of the seal is curved in a circumferential direction.

10. A turbomachine blade assembly comprising:
    two adjacent blades having blade platforms and airfoils connected thereto; and
    the combination as recited in claim 1, the at least one gap being between the adjacent blade platforms and for reducing vibrations of at least one of the blades being disposed on a side of the blade platforms facing away from the airfoils.

11. The turbomachine blade assembly as recited in claim 10 wherein the reducer is attached to at least one of the adjacent blades or movably disposed in a cavity on a side of the blade platforms facing away from the airfoils.

12. The turbomachine blade assembly as recited in claim 10 wherein the reducer includes a tuning-element guide housing having at least one cavity in which at least one tuning element is disposed with play for impacting contact with the tuning-element guide housing and the tuning-element guide housing is attached to at least one of the adjacent blades.

13. The turbomachine blade assembly as recited in claim 10 wherein the seal is disposed downstream behind the reducer or the reducer extends over only one of the two blade platforms or both blade platforms at least partially.

14. The turbomachine blade assembly as recited in claim 10 wherein the seal is disposed downstream behind the reducer.

15. A turbomachine comprising at least one turbomachine blade assembly as recited in claim 10 wherein the blades are rotor-mounted blades or casing-mounted vanes.

16. A compressor or turbine of a gas turbine comprising the turbomachine as recited in claim 15.

17. A method for operating a combination as recited in claim 1 comprising sealing the at least one gap and reducing vibrations of at least one of the blades.

18. The combination as recited in claim 7 wherein the tuning-element guide housing is at least partially produced using the generative manufacturing process or is at least partially made of the nickel alloy.

* * * * *